(12) United States Patent
Lebeau et al.

(10) Patent No.: US 8,805,690 B1
(45) Date of Patent: Aug. 12, 2014

(54) AUDIO NOTIFICATIONS

(75) Inventors: Michael J. Lebeau, Palo Alto, CA (US); John Nicholas Jitkoff, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 400 days.

(21) Appl. No.: 13/222,386

(22) Filed: Aug. 31, 2011

Related U.S. Application Data (63) Continuation of application No. 12/851,506, filed on Aug. 5, 2010.

(51) Int. Cl.
*G10L 21/00* (2013.01)

(52) U.S. Cl.
USPC ........ 704/275; 709/206; 709/207; 379/88.13; 715/800; 704/270.1

(58) Field of Classification Search
USPC ............... 704/275, 235, 270.1; 709/206, 207; 379/88.13, 88.01; 715/800
See application file for complete search history.

(56) References Cited

U.S. PATENT DOCUMENTS

| | | | | |
|---|---|---|---|---|
| 6,405,204 B1 * | 6/2002 | Baker et al. | | 705/36 R |
| 6,542,868 B1 * | 4/2003 | Badt et al. | | 704/270 |
| 6,647,272 B1 * | 11/2003 | Asikainen | | 455/466 |
| 6,907,455 B1 * | 6/2005 | Wolfe et al. | | 709/217 |
| 7,155,729 B1 * | 12/2006 | Andrew et al. | | 719/318 |
| 7,209,955 B1 * | 4/2007 | Major et al. | | 709/207 |
| 7,394,405 B2 * | 7/2008 | Godden | | 340/996 |
| 7,457,879 B2 * | 11/2008 | Horvitz et al. | | 709/227 |
| 7,975,015 B2 * | 7/2011 | Horvitz et al. | | 709/207 |
| 8,099,046 B2 | 1/2012 | Helferich | | |
| 8,350,681 B2 | 1/2013 | Bells | | |
| 8,595,642 B1 | 11/2013 | Lagassey | | |
| 2002/0077830 A1 | 6/2002 | Suomela et al. | | |
| 2004/0088358 A1 * | 5/2004 | Boda et al. | | 709/206 |
| 2004/0127198 A1 | 7/2004 | Roskind et al. | | |
| 2005/0013417 A1 * | 1/2005 | Zimmers et al. | | 379/37 |
| 2005/0075883 A1 * | 4/2005 | Lipe et al. | | 704/270 |
| 2005/0283368 A1 * | 12/2005 | Leung | | 704/270 |
| 2006/0036695 A1 * | 2/2006 | Rolnik | | 709/206 |
| 2006/0195554 A1 * | 8/2006 | Payne et al. | | 709/219 |
| 2006/0248183 A1 | 11/2006 | Barton | | |
| 2007/0130337 A1 * | 6/2007 | Arnison | | 709/225 |
| 2007/0153993 A1 * | 7/2007 | Cohen | | 379/100.05 |
| 2007/0162582 A1 * | 7/2007 | Belali et al. | | 709/223 |
| 2008/0063154 A1 * | 3/2008 | Tamari et al. | | 379/88.13 |
| 2008/0071544 A1 * | 3/2008 | Beaufays et al. | | 704/270.1 |
| 2008/0082603 A1 | 4/2008 | Mansour et al. | | |
| 2008/0205602 A1 | 8/2008 | Bishop | | |
| 2008/0261569 A1 * | 10/2008 | Britt et al. | | 455/414.1 |
| 2009/0006100 A1 | 1/2009 | Badger et al. | | |
| 2009/0030697 A1 * | 1/2009 | Cerra et al. | | 704/275 |
| 2009/0077045 A1 * | 3/2009 | Kirchmeier et al. | | 707/3 |
| 2009/0134982 A1 | 5/2009 | Robertson et al. | | |
| 2009/0135008 A1 * | 5/2009 | Kirchmeier et al. | | 340/540 |
| 2009/0143057 A1 * | 6/2009 | Arun et al. | | 455/418 |

(Continued)

*Primary Examiner* — Vijay B Chawan
(74) *Attorney, Agent, or Firm* — Fish & Richardson P.C.

(57) ABSTRACT

A computer-implemented method of determining when an audio notification should be generated includes detecting receipt of a triggering event that occurs on a user device; generating, based on detecting, the audio notification for the triggering event; receiving, from the user device, a user voice command responding to the audio notification; and generating a response to the user voice command based on one or more of (i) information associated with the audio notification, and (ii) information associated with the user voice command.

20 Claims, 8 Drawing Sheets

(56) References Cited

U.S. PATENT DOCUMENTS

| | | |
|---|---|---|
| 2009/0177990 A1 | 7/2009 | Chen et al. |
| 2009/0203403 A1* | 8/2009 | Gidron et al. ................. 455/557 |
| 2009/0204680 A1* | 8/2009 | Kirkpatrick .................. 709/206 |
| 2009/0224867 A1* | 9/2009 | O'Shaughnessy et al. .... 340/5.1 |
| 2009/0228509 A1* | 9/2009 | McCarthy et al. ............ 707/102 |
| 2009/0238386 A1 | 9/2009 | Usher et al. |
| 2009/0253428 A1 | 10/2009 | Bhatia et al. |
| 2009/0265470 A1 | 10/2009 | Shen et al. |
| 2009/0276215 A1* | 11/2009 | Hager ........................... 704/235 |
| 2009/0286514 A1* | 11/2009 | Lichorowic et al. ....... 455/412.2 |
| 2009/0298529 A1* | 12/2009 | Mahajan .................... 455/550.1 |
| 2010/0058231 A1* | 3/2010 | Duarte et al. ................. 715/800 |
| 2010/0064057 A1* | 3/2010 | Salim et al. .................. 709/246 |
| 2010/0082391 A1* | 4/2010 | Soerensen et al. ................ 705/8 |
| 2010/0088100 A1 | 4/2010 | Lindahl |
| 2010/0088387 A1 | 4/2010 | Calamera |
| 2010/0146057 A1* | 6/2010 | Abu-Hakima et al. ....... 709/206 |
| 2010/0156631 A1 | 6/2010 | Roth |
| 2010/0211644 A1 | 8/2010 | Lavoie et al. |
| 2010/0274689 A1* | 10/2010 | Hammad et al. ................. 705/30 |
| 2010/0291972 A1* | 11/2010 | Gandhi et al. ................ 455/563 |
| 2010/0312547 A1 | 12/2010 | Van Os et al. |
| 2010/0324901 A1 | 12/2010 | Carter et al. |
| 2011/0022393 A1* | 1/2011 | Waller et al. ................... 704/270 |
| 2011/0035219 A1* | 2/2011 | Kadirkamanathan et al. ............................ 704/239 |
| 2011/0055754 A1 | 3/2011 | Nicholas, III et al. |
| 2011/0144989 A1* | 6/2011 | Dowlatkhah .................. 704/235 |
| 2011/0173574 A1 | 7/2011 | Clavin et al. |
| 2011/0184730 A1* | 7/2011 | LeBeau et al. ................ 704/201 |
| 2011/0195758 A1* | 8/2011 | Damale et al. ............. 455/569.1 |
| 2011/0301958 A1* | 12/2011 | Brush et al. ................... 704/275 |
| 2011/0307559 A1 | 12/2011 | Son et al. |

\* cited by examiner

AUDIO NOTIFICATIONS

CROSS-REFERENCE TO RELATED APPLICATIONS

This patent application is a continuation of, and claims priority to, U.S. patent application Ser. No. 12/851,506, which was filed on Aug. 5, 2010. The contents of U.S. patent application Ser. No. 12/851,506 are hereby incorporated by reference into this patent application as if set forth herein in full.

TECHNICAL FIELD

This patent application relates generally to determining a set of behaviors indicative of when an audio notification message should be delivered to a user of a mobile device.

BACKGROUND

A notification system delivers a message to a set of recipients upon detection of a pre-defined event, such as a new email message in an inbox, a new topic added to a web page, and a system outage. A notification system may also take into consideration the hours in which a recipient can be notified. For example, a user of the notification system may indicate that notification messages should only be sent to the user between the hours of 9 am to 5 pm. Accordingly, the notification system will not send notification messages to the user outside of those hours.

SUMMARY

In one aspect of the present disclosure, a computer-implemented method of determining when an audio notification should be generated includes detecting receipt of a triggering event that occurs on a user device; generating, based on detecting, the audio notification for the triggering event; receiving, from the user device, a user voice command responding to the audio notification; and generating a response to the user voice command based on one or more of (i) information associated with the audio notification, and (ii) information associated with the user voice command.

Implementations of the disclosure may include one or more of the following features. In some implementations, the method further includes determining that the user voice command includes one or more keywords in a set of acceptable keywords. The method also includes retrieving a timer associated with the triggering event, wherein the timer includes information associated with a period of time to listen for the user voice command; determining that a current period of time exceeds the period of time to listen for the user voice command; generating a timeout message, and sending the timeout message to the user device.

In other implementations, the method includes receiving information for one or more attributes associated with the audio notification, wherein the one or more attributes include one or more of (i) information for a type of audio notification, (ii) information for a communication mode of the audio notification, and (iii) information indicative of a period of time to listen for the user voice command. The audio notification may include a first audio notification, and the method also includes determining an overlapping condition between the first audio notification and a second audio notification; retrieving one or more overlapping notification rules; determining, based on the one or more overlapping notification rules, a first priority value for the first audio notification and a second priority value for the second audio notification, wherein the first priority value includes information indicating that the first audio notification should be sent to the user device before the second audio notification is sent to the user device; sending the first audio notification to the user device; and placing the second audio notification in a queue of audio notification messages.

In still other implementations, the method includes detecting receipt of the first audio notification by the user device; and sending the second audio notification to the user device. The triggering event may include one or more of a voicemail message, an electronic mail message, a simple messaging service (SMS) message, a network alert message, and an Internet alert message.

In another aspect of the disclosure, one or more machine-readable media are configured to store instructions that are executable by one or more processing devices to perform functions including detecting receipt of a triggering event that occurs on a user device; generating, based on detecting, the audio notification for the triggering event; receiving, from the user device, a user voice command responding to the audio notification; and generating a response to the user voice command based on one or more of (i) information associated with the audio notification, and (ii) information associated with the user voice command. Implementations of this aspect of the present disclosure can include one or more of the foregoing features. Implementations of this aspect of the present disclosure can include one or more of the foregoing features.

In still another aspect of the disclosure, an electronic system for determining when an audio notification should be generated includes one or more processing devices; and one or more machine-readable media configured to store instructions that are executable by the one or more processing devices to perform functions including: detecting receipt of a triggering event that occurs on a user device; generating, based on detecting, the audio notification for the triggering event; receiving, from the user device, a user voice command responding to the audio notification; and generating a response to the user voice command based on one or more of (i) information associated with the audio notification, and (ii) information associated with the user voice command. Implementations of this aspect of the present disclosure can include one or more of the foregoing features.

In yet another aspect of the disclosure, an electronic system for determining when an audio notification should be generated includes an electronic voice input device; a event detection manager configured to: detect one or more triggering events received by the electronic voice input device; an audio notification manager configured to: generate the audio notification based on detection of the one or more triggering events; and receive, from a user of the electronic system, a user voice command responding to the audio notification; means for providing, from the audio notification manager to the electronic voice input device, the audio notification that notifies the user of the electronic system of the one or more triggering events; and means for generating a response to the user voice command based on one or more of (i) information associated with the audio notification, and (ii) information associated with the user voice command. Implementations of this aspect of the present disclosure can include one or more of the foregoing features.

All or part of the foregoing may be implemented as a computer program product comprised of instructions that are stored on one or more non-transitory machine-readable storage media, and that are executable on one or more processing devices. All or part of the foregoing may be implemented as an apparatus, method, or system that may include one or more processing devices and memory to store executable instructions to implement the stated functions.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Described herein is a system which determines when and how notification messages (e.g., audio notification messages) are provided (e.g., audibly played) to a user of a mobile device. The system also determines how the user can follow up on the notification messages, for example, by providing a voice command to the system requesting that the system perform an action (e.g., sending an email message, a text message, a "note-to-self" message, and so forth.)

Figure 1:
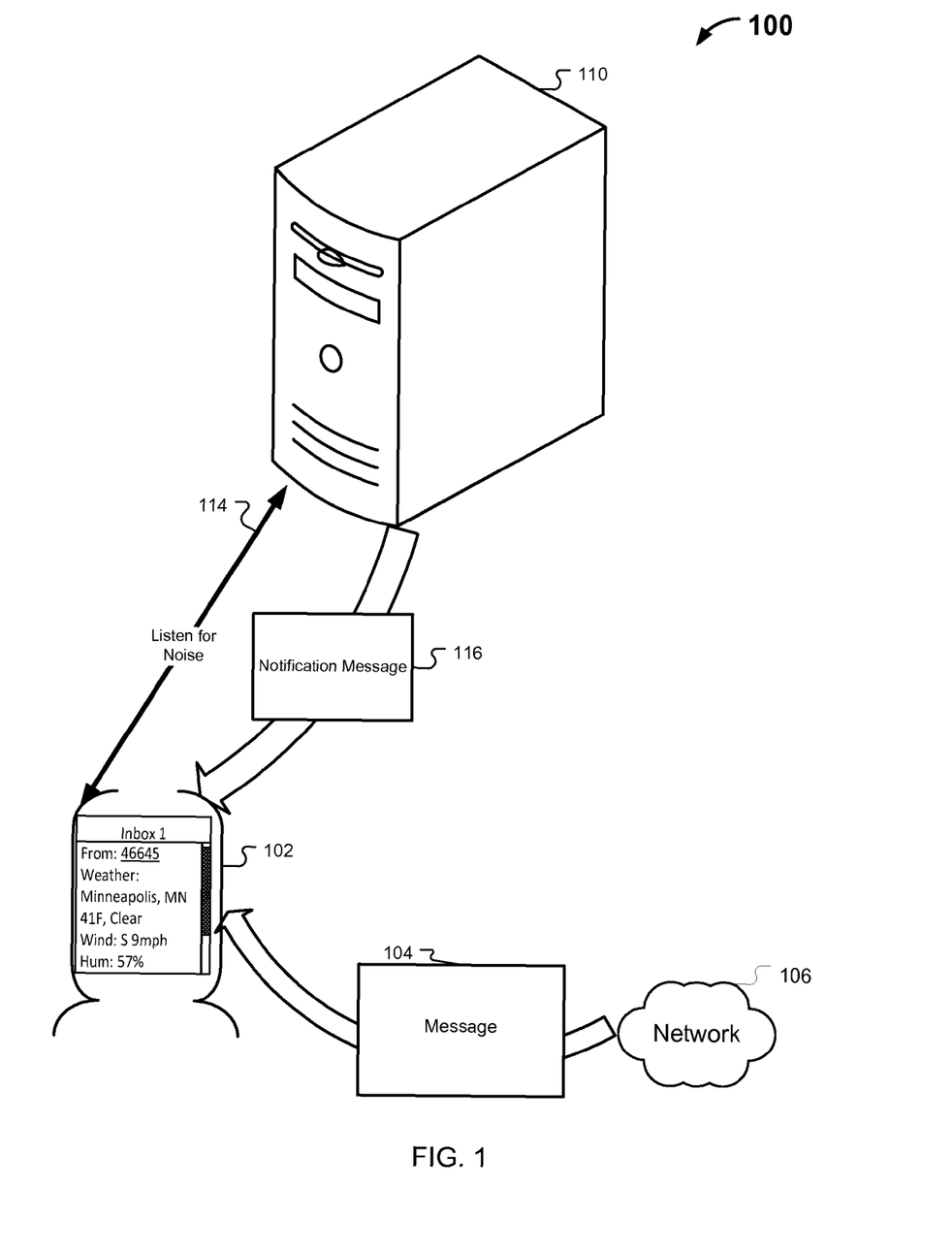
FIG. 1 is a conceptual diagram of a system for providing notification messages.

FIG. 1 is a conceptual diagram of system 100 for providing notification messages. System 100 includes client device 102, network 106 and notification server 110. Client device 102 is configured to receive message 104 (e.g., a simple message service ("SMS") message) from network 106. Notification server 110 is configured to generate notification messages based on detection of "notification conditions" (e.g., a pre-defined-event, including receipt of an email message, receipt of a text message, receipt of a voicemail message, and so forth) that occur on client device 102. Notification messages include email messages, text messages, SMS messages, and so forth. Upon detection of a notification condition, notification server 110 executes "notification rules" (e.g., instructions that determine when a notification message should be generated based on detected notification conditions), as described herein.

Notification server 110 listens over communication link 114 to noise (e.g., ambient noise) received from client device 102. Based on the received noise, notification server 110 detects an occurrence of a notification condition on client device 102, for example, receipt of message 104 by client device 102. Upon detection of a notification condition, notification server 110 generates and sends notification message 116 to client device 102.

Notification server 110 may include application files, which are accessible by application developers to define a "notification action" (e.g., information indicative of how notification messages are provided to client device 102, information indicative of how a user of client device 102 may interact with a notification message, information indicative of notification conditions, information indicative of notification rules, and so forth) for an "application" (e.g., a computer program product that is executable by client device 102). For example, a notification action may include instructions regarding how notification messages are played for a user of client device 102.

A notification action may also include "notification attributes", including, e.g., attributes associated with a notification message, including whether to wait for a user response to a notification message, an amount of time to wait for the user response, categories (e.g., keywords) of acceptable user responses, whether to play an accompanying sound with the notification message, a notification environment (e.g., whether to play the notification message in pre-defined environments, including, e.g., a car, a location in which a Bluetooth earpiece is in use by a user of client device 102, a docking station, and so forth), and a notification type (e.g., an ongoing notification message, a one-time notification message, and so forth).

Figure 2:
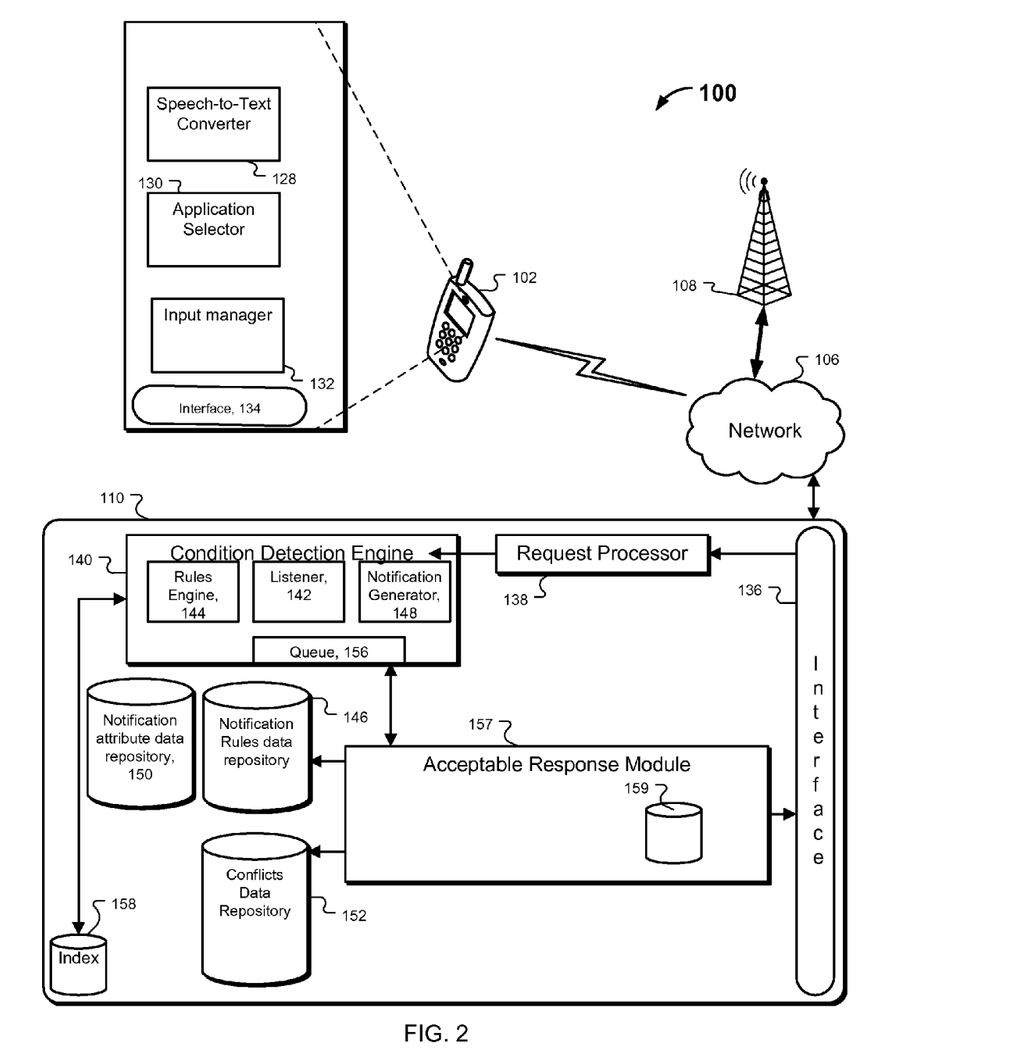
FIG. 2 is a block diagram of components of the system for providing notification messages.

FIG. 2 is a block diagram of the components of system 100 for providing notification messages. Client device 102 can be any sort of computing device capable of taking input from a user and communicating over network 106 with notification server 110. For example, client device 102 can be a mobile device, a desktop computer, a laptop, a cell phone, a personal digital assistant ("PDA"), a server, an embedded computing system, and so forth.

Network 106 can be any of a variety of networks over which client device 102 and notification server 110 can communicate. For example, network 106 may include a mobile network, a local area network ("LAN"), a wide area network ("WAN"), the Internet, an intranet, a wireless network, a point-to-point network, and so forth. Network 106 transmits data from client device 102 to notification server 110. Notification server 110 can be any of a variety of computing devices capable of receiving data, such as a server, a distributed computing system, a desktop computer, a laptop, a cell phone, a rack-mounted server, and so forth. Network 106 is configured to communicate with cell site 108 (e.g., a cellular tower, a base transceiver station, and so forth) to send and to receive electronic communications, for example, from other mobile networks.

Client device 102 includes speech-to-text converter 128 to record voice input provided to a microphone (not shown) on client device 102 and to convert the recorded voice input to corresponding text information. For example, a user of client device 102 may provide voice input (e.g., to perform an action) to a microphone on client device 102 in response to a notification message. In this example, speech-to-text converter 128 converts the voice input to corresponding text information and input manager 132 sends the corresponding text information to notification server 110 for analysis.

Client device 102 also includes application selector 130 to determine an application associated with a notification message. For example, client device 102 may execute a text message application, an email application, and a web alert application. Client device 102 receives a notification message for the email application from notification server 110. In this example, the notification message includes "application information", which can be information indicative of the application for which the notification message is directed. Application information may include, for example, information identifying an email application. Application selector 130 analyzes the application information to determine that the notification message is directed towards the email application. Application selector 130 sends the notification message to the email application, where the notification message is executed and/or played for a user of client device 102.

Client device 102 also includes input manager 132 to control the handling of data that is received from a user through a microphone, touchscreen or other input mechanism on client device 102. For example, input manager 132 captures voice spoken into a microphone on client device 102 as an audio file and sends the audio file to speech-to-text converter 128 for conversion to a text file. Input manager 132 may also be configured to send ambient noise and other signal information to notification server 110.

Input manager 132 transmits data (e.g., ambient noise, a text file, voice input data, and so forth) from client device 102 to notification server 110 via an input/output ("I/O") interface 134. I/O interface 134 can be any type of interface capable of communicating with notification server 110 over network 106, such as an Ethernet interface, a wireless networking interface, a fiber-optic networking interface, a modem, and so forth.

Notification server 110 can receive data from client device 102 via network 106 at I/O interface 136 for notification server 110. I/O interface 136 provides the received data to request processor 138. Request processor 138 formats the data for processing by condition detection engine 140, which is configured to detect an occurrence of a notification condition on client device 102. Condition detection engine 140 includes listener module 142 that is configured to "listen" to information broadcast from client device 102 and/or an application server and to parse the broadcast information to detect noise indicative of a notification condition. In an example, when an application server sends an email message to client device 102, application server broadcasts information indicating that application server has sent a message to client device 102. Upon detection of a notification condition, listener module 142 passes information indicative of the detected notification condition to rules engine 144, as described in further detail below.

Listener module 142 also determines the application for which a notification condition has been detected based on information broadcast from client device 102. In an example, client device 102 may broadcast information indicating that client device 102 has received an email message from an email application. In this example, listener module 142 may detect that an email message has been received by the email application, which is running on client device 102. In another example, listener module 142 may detect that an email message has been received by a propriety email application, which is also running on client device 102. Listener module 142 passes to rules engine 144 information indicative of a name of the application for which a notification condition has been detected. As described in further detail below, rules engine 144 uses the information indicative of the name of the application for which a notification condition has been detected to select appropriate notification attributes.

Rules engine 144 also accesses notification rules data repository 146. Notification rules data repository 146 stores rules that indicate a type of notification message to be generated based on a detected notification condition. For example, types of notification messages include an email notification message, a SMS notification message, a voicemail notification message, a web alert notification message, and so forth.

In an example of a notification rule for an email notification message, the notification rule may include the following instructions: if notification condition="email received," then type of notification message="email notification message." Rules engine 144 applies the notification rules to a notification condition to determine a type of notification message to be generated by notification generator 148. Rules engine 144 passes notification generator 148 information indicative of the type of notification message to be generated.

Rules engine 144 also accesses notification attribute data repository 150, which stores notification attributes for various types of notification messages. Notification attribute data repository 150 may include a table that maps notification attributes to a type of notification message for an application, an example of which is provided in Table 1 below.

TABLE 1

| Application Name | User Response? | Amount of time | Notification Type | Sound? | Play contents? |
|---|---|---|---|---|---|
| Email | | | | | |
| 1. email client | Yes | 60 seconds | One-time | Yes | Yes |
| 2. Developer Joe's email application | No | N/A | One-time | Yes | Yes |
| SMS message | | | | | |
| 1. Developer Chris's SMS Application | No | N/A | One-time | No | Yes |
| 2. Developer Liza's SMS Application | Yes | 15 seconds | On-going | No | Yes |

As illustrated in the above Table 1, notification attribute data repository 150 includes a "user response?" notification attribute, an "amount of time" notification attribute, a "notification type" notification attribute, a "sound?" notification attribute, and a "play contents?" notification attribute (e.g., the contents of an email message, SMS message, and so forth are played for a user).

In an example where the "play contents?" notification attribute is selected for a notification message, notification server 110 sends client device 102 a notification message including textual information. Client device 102 applies a text-to-speech converter to convert the textual information in the notification message to audio information that may be audibly played by client device 102.

In another example, notification attribute data repository 150 includes an "environment" notification attribute (not shown). As described herein, environment notification attributes may be detected by notification server 110 and/or by a client device. In this example, the environment notification attribute includes information indicative of environments (e.g., physical settings, geographical locations, behavior of a user within a physical setting, and so forth) in which a notification message should be played and/or rendered for the user.

For example, an environment notification attribute may specify that an audio notification message should be played for a user of client device 102 when a sensor included in client device 102 (and/or included in notification server 110) detects that client device 102 is located in a pre-defined physical environment (e.g., an automobile, a car, a retail store, and so forth). In this example, the sensor included in client device 102 (and/or in notification server 110) may detect that client device 102 is located in the pre-defined physical environment when client device 102 is docked (e.g., electrically connected) in a docking station that is associated with the pre-defined physical environment.

In another example, the environment notification attribute may specify that an audio notification message should be played for a user of client device 102 when the user of client device 102 is connected to client device 102 through use of an earpiece, e.g., a Bluetooth earpiece. In yet another example, the environment notification attribute may specify that an audio notification message should be played for the user of client device 102 when a proximity sensor included in client device 102 (and/or in notification server 110) detects that the user of client device 102 is holding client device 102 within a pre-defined distance of an ear of the user.

In still another example, notification server 110 may include a listing of environment notification attributes, including information indicative of environments in which audio notification messages are delivered to client device 102. In this example, client device 102 may provide information (e.g., voice metadata) indicative of an action (e.g., receipt of an email message) to notification server 110. Notification server 110 may compare the information, which was provided by client device 102, to the listing of environment notification attributes to determine whether a notification message should be generated, for example, by notification server 110.

For example, client device 102 may provide notification server 110 with information indicating that client device 102 received an email message. In this example, the environment notification attributes include the following criteria: if user of a client device is in an automobile when action is received, then generate notification message. If notification server 110 determines that a user of client device 102 is physically located in an automobile (e.g., through receipt of information detected by a sensor on client device 102 and sent to notification server 110, through detection of a physical location of client device 102 by a sensor included in notification server 110, and so forth), then notification server 110 generates a notification message.

Rules engine 140 also accesses conflicts data repository 152. Conflicts data repository 152 includes rules that specify the handling of "conflicting notification messages", which may include notification messages that are associated with logically inconsistent notification actions. Conflicting notification messages may include "overlapping notification messages", which may include notification messages that are scheduled by notification server 110 to be sent at a concurrent time to client device 102. Conflicts data repository 152 may include "conflict resolution rules" that determine how a conflict between notification messages is resolved. For example, a conflict resolution rule may include information indicative of which notification message to send first in time to client device 102.

In an example of two overlapping notification messages, notification generator 148 generates a first notification message associated with the email client application and a second notification message associated with Developer Chris's SMS application. The first and second notification messages are overlapping notification messages, because the first and second notification messages are scheduled to be sent to client device 102 at the same time.

In this example, a conflict resolution rule determines an order in which to execute overlapping notification messages for four applications, such as the email client application, Developer Chris's SMS application, Developer Joe's email application, and Developer Liza's SMS application. The conflict resolution rules may determine an execution order of overlapping notification messages based on the name of the application associated with the notification message. The conflict resolution rules may specify that notification messages associated with the email client application are executed first, notification messages associated with Developer Chris's SMS application are executed second, notification messages associated Developer Joe's email application are executed third, and notification messages associated with Developer Liza's SMS Application are executed fourth.

Based on execution of the conflict resolution rule, rules engine 144 associates the first notification message with "priority information", which may include information indicating a priority in which the first notification message is executed with regard to the second notification message. In this example, the priority information for the first notification message includes information indicating that the first notification message should be sent to client device 102 before the second notification message. Rules engine 144 also associates the second notification message with priority information indicating that the second notification should be sent to client device 102 after the first notification message has been sent to client device 102.

Notification server 110 also includes index data repository 158, which stores "application name information", which may include information indicative of a name of an application. By using pointers (e.g., a variable that holds a virtual address of a data location) to link various data entries in data repositories 146 150, 152, 159, an application is associated with its notification action. For example, an application is associated with a notification rule through a pointer that links (i) an entry in index data repository 158 that includes information indicative of the name of the application to (ii) an entry in notification rules data repository 146 that includes information indicative of a notification rule for the application. An application is also associated with a conflict resolution rule through a pointer that links (i) the entry in index data repository 158 that includes information indicative of the name of the application, to (ii) an entry in conflicts data repository 152 that includes information indicative of a conflict resolution rule for the application. An application is also associated with notification attributes through a pointer that links (i) the entry in index data repository 158 that includes information indicative of the name of the application to (ii) an entry in notification attribute data repository 150 that includes information indicative of notification attributes for the application.

As described herein, rules engine 144 determines an application for which a notification condition has been detected, for example, by listener module 142. Using the foregoing pointers, rules engine 144 selects a notification rule associated with the application, a conflict resolution associated with the application (if necessary), and notification attributes associated with the application. Rules engine 144 sends to notification generator 148 information indicative of a type of notification message to be generated (e.g., based on execution of the notification rule), priority information (e.g., based on execution of the conflict resolution rule), and notification attributes to notification generator 148. Notification generator 148 generates a notification message based on the type of notification message, the priority information, and the notification attributes.

Condition detection engine 140 also includes queue module 156 to hold notification messages in a queue data structure based on the priority information associated with the notification messages. For example, queue module 156 may include an ordering of the notification messages as determined by the conflict resolution rules. Queue module 158 sends a notification message to client device 102 through interface 136 and network 106.

Notification sever 110 also includes acceptable response module 157, which is configured to parse a user response to a notification message to determine whether the user response includes an "acceptable action" (e.g., a list of pre-defined actions that may be performed by notification server 110 and/or client device 102 in response to a notification message).

For example, when a notification message is associated with the "user response" notification attribute (Table 1), listener module 142 on notification server 110 listens for a user response from client device 102. Listener module 142 listens for a period of time specified in the "amount of time" notification attribute. If a user provides a response within the period of time specified in the amount of time notification attribute, client device 102 sends the response to acceptable response module 157 for processing to determine whether the user response includes information indicative of an acceptable action.

Acceptable response module 157 may include data repository 159, which stores information indicative of acceptable actions. An acceptable action for an application may be defined through a pointer linking information indicative of a name of an application in index data repository 158 to an acceptable action in data repository 159. Acceptable actions may include actions to be performed by notification server 110 and/or client device 102 (e.g., send reply email, send reply text, forward email, and so forth). In an example, an application developer of an application defines acceptable actions for an application based on how a user of the application is allowed to interact with notification message. By comparing information included in the user response to information indicative of acceptable actions, acceptable response module 157 determines whether notification server 110 may execute an action requested by the user in response to a notification message. In an example, notification server 110 is configured to perform actions in addition to generation of notification messages. That is, notification server 110 is configured to perform actions indicative of acceptable actions. In this example, notification server 110 is configured to generate email messages, to generate text messages, to generate SMS messages and so forth.

Figure 3:
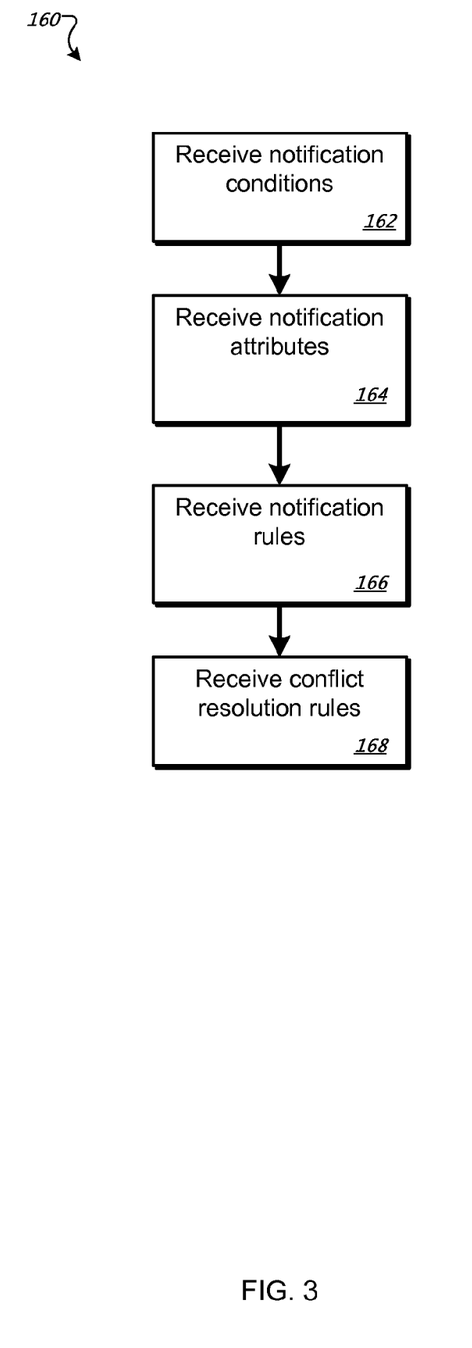
FIG. 3 is a flowchart of a process executed by the system for defining a notification action.
Figure 7:
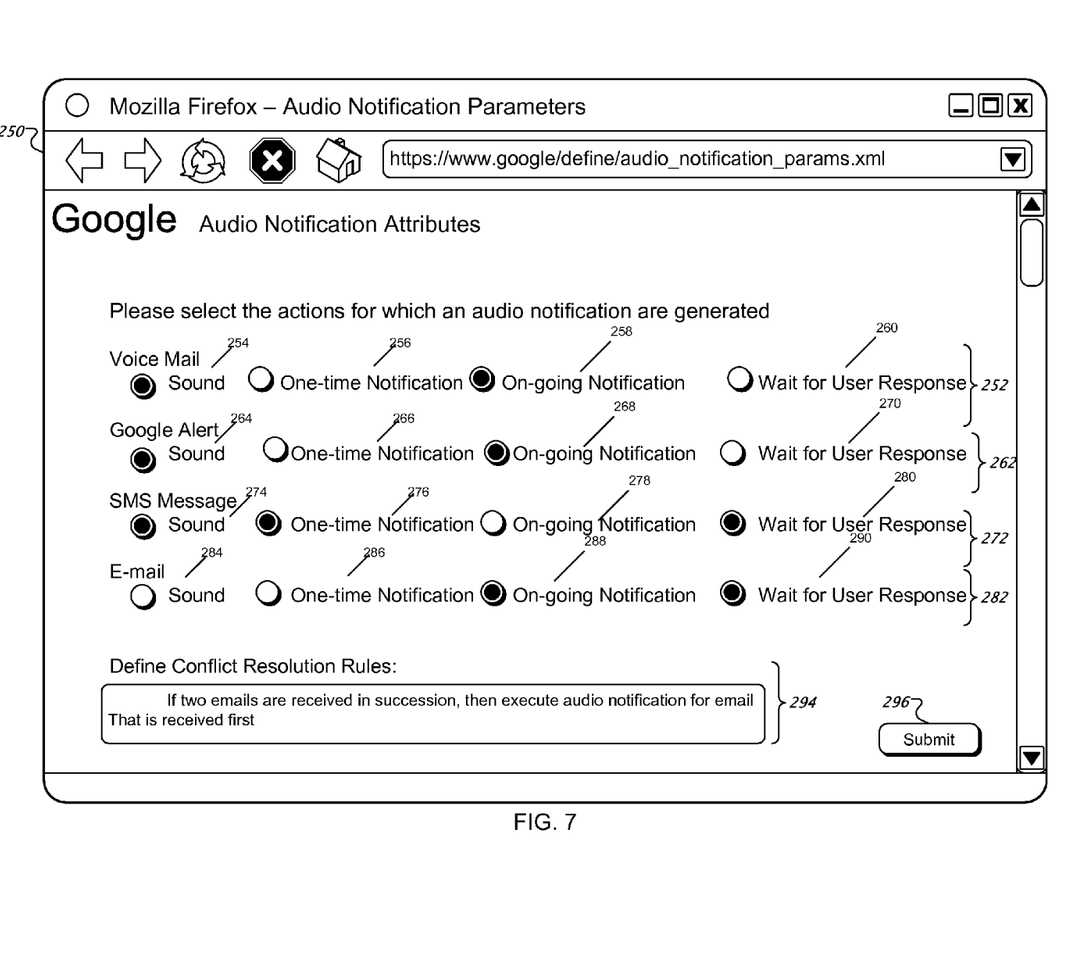
FIG. 7 is an example of a graphical user interface generated by the system and displayed on a client device.

FIG. 3 is a flowchart of process 160 executed by notification server 110 for defining a notification action. Notification server 110 receives (162), for example, a listing of notification conditions from an application developer. Notification server 110 also receives (164) information indicative of notification attributes, which may be stored in notification attribute data repository 150. Notification server 110 also receives (166) information indicative of notification rules, which may be stored in notification rules data repository 146. Notification server 110 also receives (168) information indicative of conflict resolution rules, which may be stored in conflicts data repository 152. In an example, notification server 110 generates a graphical user interface into which an application developer may input information indicative of notification conditions, notification attributes, notification rules, and conflict resolution rules (FIG. 7).

Figure 4:
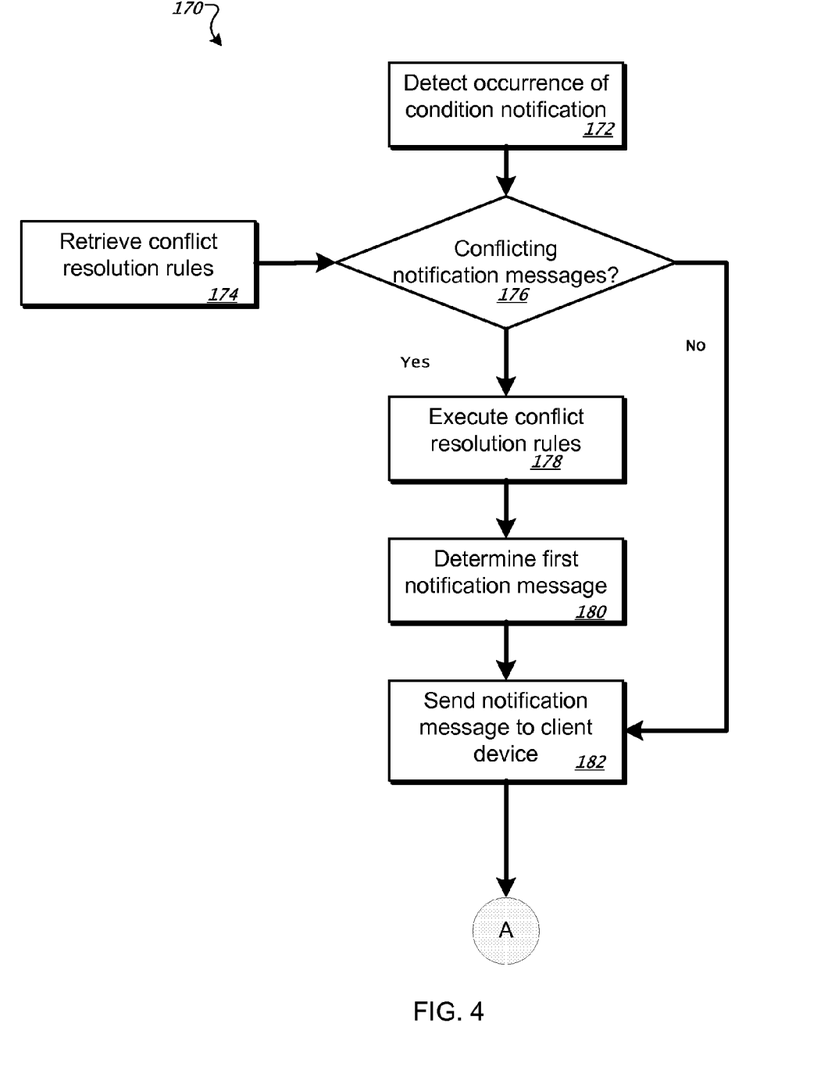
FIG. 4 is a flowchart of a process executed by the system for generating a notification message.

FIG. 4 is a flowchart of process 170 executed by notification server 110 for generating a notification message. Notification server 110 detects (172) an occurrence of a notification condition, for example, receipt of a text message on client device 102. Notification server 110 retrieves (174) conflict resolution rules, for example from conflicts data repository 152. Notification server 110 determines (176) whether a conflict exists between notification messages. If notification server 110 detects a conflict between notification messages, then notification server 110 executes (178) the conflict resolution rules and determines (180) a notification message to place first in a queue in queue module 156. Notification server 110 sends (182) the notification message first in the queue to client device 102.

If notification server 110 does not detect a conflict between notification messages, then notification server 110 sends (182), to client device 102, the notification message generated by notification generator 148.

Figure 5:
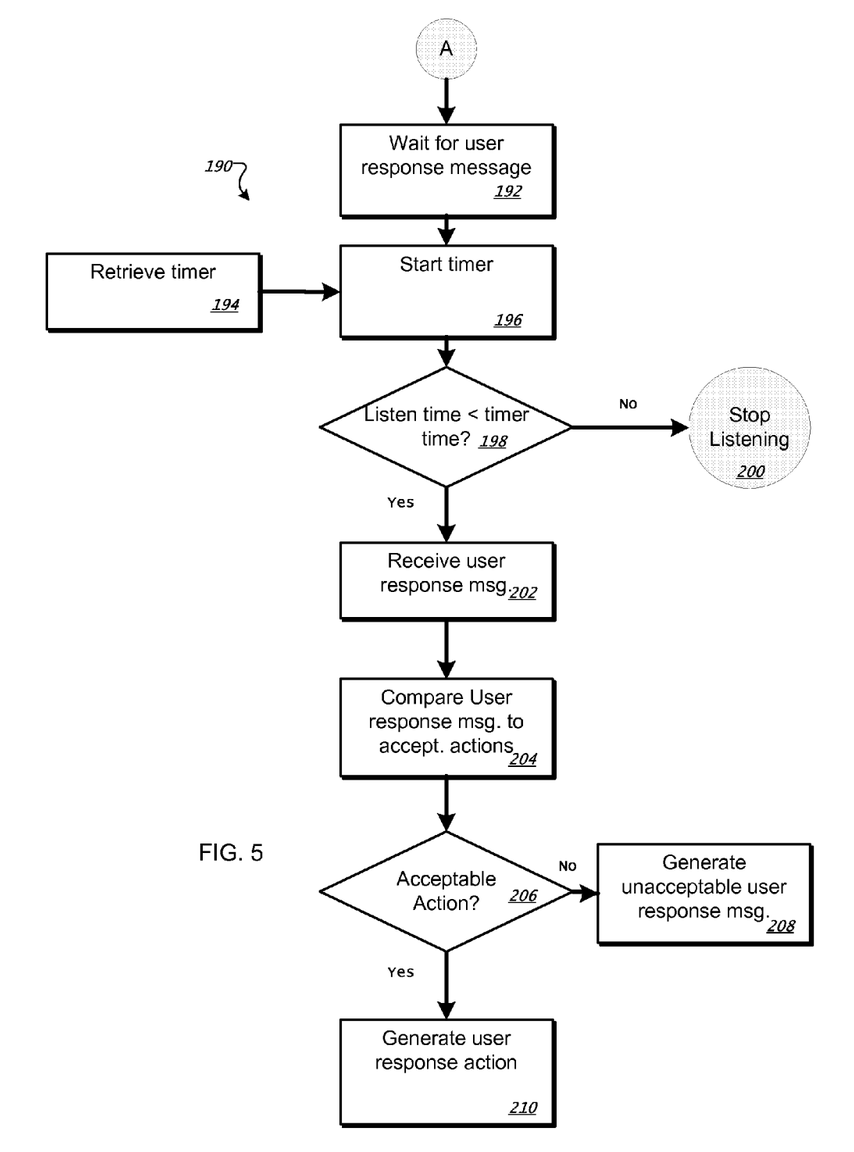
FIG. 5 is a flowchart of a process executed by the system for generating a user requested action.

FIG. 5 is a flowchart of process 190 executed by notification server 110 for generating a "user requested action", which may include an action that is generated based on a user's response to a notification message. Notification server 110 waits (192) for a "user response message", which may include a message from client device 102 in response to the notification message. Notification server 110 retrieves (194) a timer, which may include information indicative of a period of time to wait for the user response message ("timer period of time"). In an example of the "amount of time" notification attribute (Table 1), the timer period of time is set by the amount of time notification attribute. The timer may be stored in notification attribute data repository 150 and may be generated by notification server 110 based on information associated with the amount of time notification attribute, as described herein.

Notification server 110 starts (196) the timer and determines (198) whether a current "listen time" (e.g., an amount of time that has elapsed from when the time was started) exceeds the timer period of time. If the listen time exceeds the timer period of time, notification server 110 stops (200) listening for the user response message.

If the listen time is less than the timer period of time, notification server 110 continues listening and receives (202) the user response message. Notification server 110 compares (204), for example using acceptable response module 157, information included in the user response message to information indicative of the acceptable actions for an application. Based on the comparison, notification server 110 determines (206) whether the user response message includes information indicative of an acceptable action.

If notification server 110 determines that the user response message fails to include information indicative of an acceptable action, notification server 110 generates (208) an "unacceptable user requested action" message and sends the unacceptable user requested action message to client device 102. The unacceptable user requested action message prompts a user of client device 102 to provide information indicative of an acceptable action, for example, by providing the user with a listing of acceptable actions.

If notification server 110 determines that the user response message includes information indicative of an acceptable action, then notification server 110 generates (210) a user requested action using information indicative of a context (e.g., a type of notification message, contents of the notification message, and so forth) of the notification message and/or indicative of a context of the user response message. In an example of client device 102 receiving an email message, notification server 110 sends client device 102 a notification message that includes an audio file that when executed by client device 102 plays a "you have a new email" audio message. The user responds to the notification message with a user response message that includes voice input corresponding to "send reply email to Mike Blas".

In this example, notification server 110 receives the user response message. Acceptable response module 157 compares information indicative of acceptable actions to the text "send reply email to Mike Blas." Because information indicative of acceptable actions includes the words "send" and "email," notification server 110 determines that the user requested action is an acceptable action and generates a user requested action, e.g., a reply email to "Mike Blas", using a context of the user response message. Notification server 110 sends the reply email to client device 102 for review by a user of client device 102.

Figure 6:
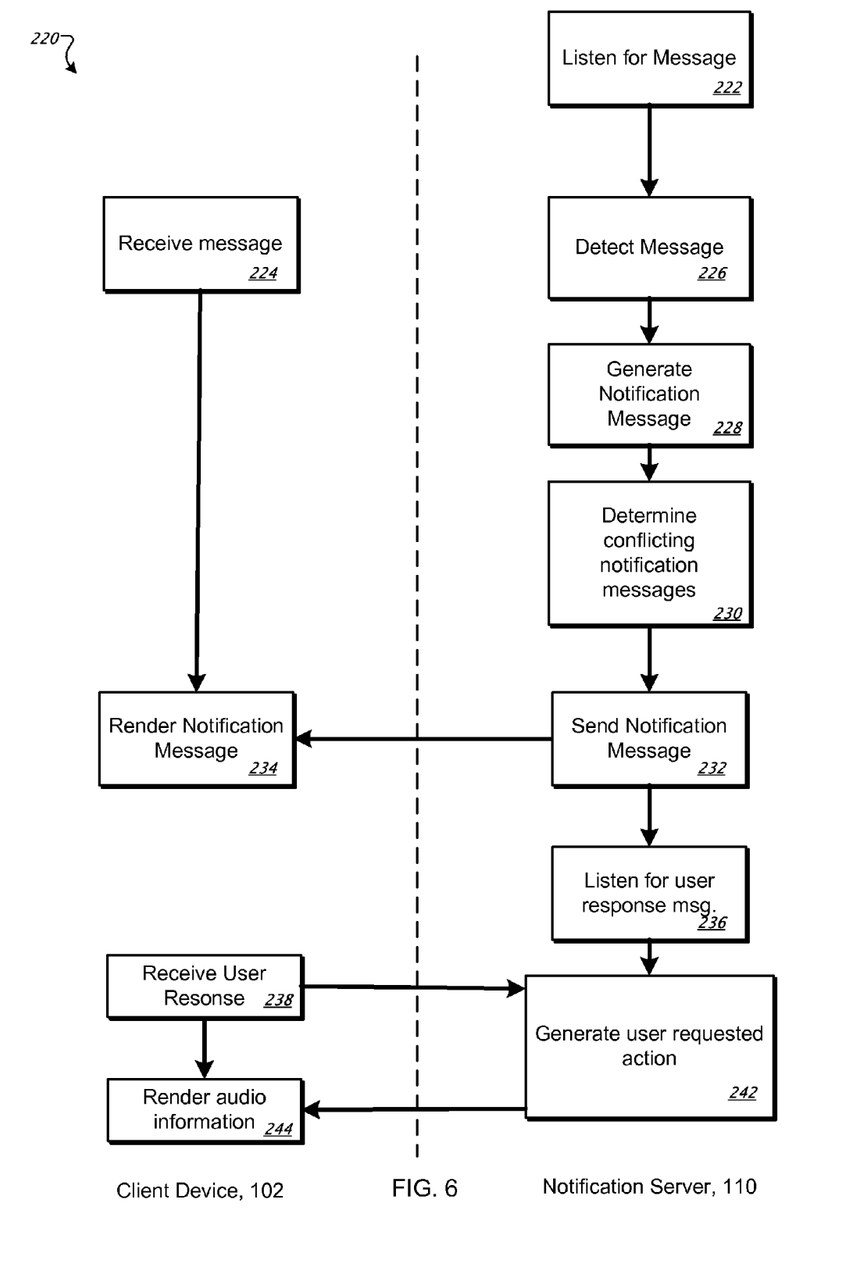
FIG. 6 is a swim lane diagram of a process by which a client device interfaces with a server to receive notification messages.

FIG. 6 is a swim lane diagram of process 220 by which client device 102 interfaces with notification server 110 to receive notification messages. Notification server 110 listens (222) for messages to be received by client device 102. Client device 102 receives (224) a message, for example from network 106. Notification server 110 detects (226), for example by analyzing ambient noise received from client device 102 and/or application information (or other broadcast information indicating that an application server has sent a message to client device 102) received from an application server, as described above, the receipt of the message by client device 102. Notification server 110 generates (228) a notification message (e.g., an audio notification message). Notification server 110 determines (230) whether the generated notification message conflicts with other notification messages, as described herein. Based on an application of conflict resolution rules, notification server 110 selects a notification message and sends (232) the selected notification message to client device 102.

Client device 102 renders (234) (e.g., through a visual display, through an audio playback, and so forth) the notification message for a user of client device 102, for example using an audio player in client device 102 to play an audio notification. Notification server 110 listens (236) a period of time for a user response message. Client device 102 receives (238) a user response to the notification message, generates a user response message, and sends the user response message to notification server 110.

Notification server 110 receives the user response message and generates (242) a user requested action using a context of the notification message and/or a context of the user response message. Client device 102 receives information indicative of the user requested action and renders (244) audio information corresponding to the information indicative of the user requested action for a user of client device 102.

FIG. 7 is an example of graphical user interface 250 generated by notification server 110 and displayed on client device 102. Graphical user interface 250 renders a visual representation of information included in an Extensible Markup Language ("XML") file. Through the XML file, an application developer may define notification attributes that are associated with a notification message.

Graphical user interface includes section 252, which includes notification attributes for a "voice mail" notification message. In the illustrative example of FIG. 7, notification attributes include "sound" notification attribute 254, "one-time" notification attribute 256, "on-going" notification attribute 258, and "wait for user response" notification attribute 260.

Graphical user interface also includes section 262, which includes notification attributes 264, 266, 268, 270 associated with a web alert notification message. Graphical user interface also includes section 272, which includes notification attributes 274, 276, 278, 280 associated with a "SMS" notification message. Graphical user interface also includes section 282, which includes notification attributes 284, 286, 288, 280 associated with an "email" notification message.

Through links (e.g., radio buttons, hyperlinks, and so forth) associated with "sound" notification attributes 254, 264, 274, 284, an application developer selects whether notification messages are associated with a sound, for example an audio file that is played to alert a user of client device 102 of a notification condition. Through links associated with "one-time" notification attributes 256, 266, 276, 286 and links associated with "on-going" notification attributes 258, 268, 278, 288, an application developer selects whether notification messages should be rendered for a user of client device 102 a single time or on an on-going basis. Additionally, through links associated with "wait for user response" notification attributes 260, 270, 280, 290, an application developer selects whether notification server 110 waits for a user response following rendering of a notification message. If the links associated with wait for user response notification attributes 260, 270, 280, 290 are selected, notification server 110 generates another graphical user interface (not shown) through which an application developer may enter a period of time for notification server 110 to listen for a user response.

Graphical user interface 250 also includes section 294 for an application developer to define conflict resolution rules, for example that are saved in conflicts data repository 152. Graphical user interface 250 includes link 296, selection of which sends information associated with selected notification attributes and defined conflict resolution rules to notification server 110. Notification server 110 receives the information and stores the information in a data repository, for example, data repositories 146, 150, 152 (FIG. 2).

Figure 8:
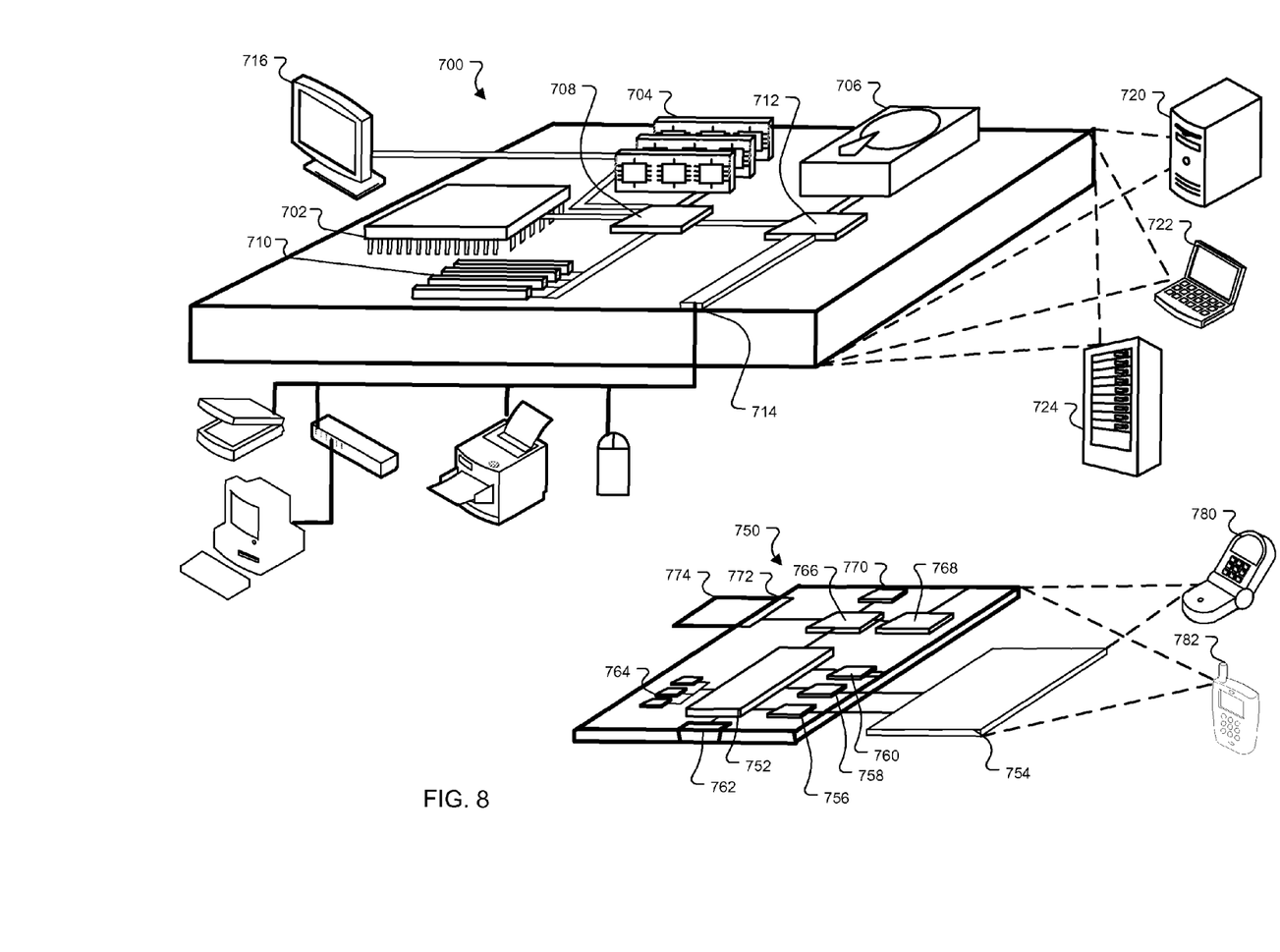
FIG. 8 shows an example of a computer device and a mobile computer device that can be used to implement the techniques described herein.

FIG. 8 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, and so forth) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. In an example, the configuration of the system may be the same as in FIG. 2, except that client device 102 includes a text-to-speech converter to convert textual information included in a notification message received from notification server 110 to audio information for audio playback by client device 102.

In another example, client device 102 records a user's interaction with a notification message. A notification message includes selectable links. Client device 102 records information indicative of an identity of a link selected by a user and an amount of time elapsed from the rendering of the notification message to the selection of the link. Client device 102 sends notification server 110 the information and notification server 110 uses the information in generating a user response message. In this example, the user requested action may include information associated with a link that was selected by the user in the notification message.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Although a few implementations have been described in detail above, other modifications are possible. Moreover, other mechanisms for editing voice may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other embodiments not specifically described herein are also within the scope of the following claims.

What is claimed is:

1. A method comprising:
   detecting a notification condition, the notification condition comprising an event that occurred on a client device with which a server is configured to communicate;
   identifying a first application that is stored at the client device, wherein the first application is configured to generate data for rendering a first notification message related to the notification condition;
   generating the first notification message for the notification condition, the first notification message comprising one or more attributes, the one or more attributes at least specifying how the first notification message is to be presented by the first application at the client device;
   detecting a conflict between transmittal of the first notification message at a time that is concurrent with transmittal of a second notification message, wherein a second application is stored at the client device and is configured to generate data for rendering the second notification message and the first application differs from the second application;
   applying one or more conflict rules to the first notification message and the second notification message;
   selecting, based on application of the one or more conflict rules, the first notification message for transmittal to the client device;
   transmitting the first notification message to the client device;
   receiving, from the client device, a response to the first notification message, the response comprising data corresponding to audio input to the client device; and
   performing an action specific to the first application based on the response.

2. The method of claim 1, wherein the first notification message comprises an indication that a communication has been received by the client device, and wherein the action comprises:
   generating a reply to the communication received by the client device, the reply being formatted for sending by the first application; and
   sending the reply to the client device.

3. The method of claim 1, wherein the response comprises an indication of the action, the method further comprising:
   making a determination that the action is an acceptable action.

4. The method of claim 1, further comprising:
  determining, based on the one or more conflict rules, a priority associated with the first and second notification messages;
  wherein the first notification message is sent to the client device in accordance with the priority.

5. The method of claim 1, wherein detecting the notification condition comprises analyzing ambient noise from a device that caused the event.

6. The method of claim 1, wherein detecting the notification condition and identifying the first application are performed by analyzing information provided by the client device or an application server.

7. The method of claim 1, wherein the one or more attributes specify an audible presentation of the first notification message by the client device.

8. The method of claim 1, wherein the one or more attributes specify how the first notification message is to be presented based on an environment associated with the client device.

9. The method of claim 1, further comprising:
  determining an overlapping condition between the first notification message and the second notification message;
  determining, based on one or more overlapping notification rules, a first priority value for the first notification message and a second priority value for the second notification message;
  wherein the first priority value comprises information indicating that the first notification message should be sent to the client device before the second notification message is sent to the client device;
  sending the first notification message to the client device; and
  placing the second notification message in a queue of audio notification messages.

10. One or more non-transitory machine-readable storage media storing instructions that are executable by one or more processing devices to perform operations comprising:
  detecting a notification condition, the notification condition comprising an event that occurred on a client device that is configured for communication with the one or more processing devices;
  identifying a first application that is stored at the client device, wherein the first application is configured to generate data for rendering a first notification message related to the notification condition;
  generating the first notification message for the notification condition, the first notification message comprising one or more attributes, the one or more attributes at least specifying how the first notification message is to be presented by the first application at the client device;
  detecting a conflict between transmittal of the first notification message at a time that is concurrent with transmittal of a second notification message, wherein a second application is stored at the client device and is configured to generate data for rendering the second notification message and the first application differs from the second application;
  applying one or more conflict rules to the first notification message and the second notification message;
  selecting, based on application of the one or more conflict rules, the first notification message for transmittal to the client device;
  transmitting the first notification message to the client device;
  receiving, from the client device, a response to the first notification message, the response comprising data corresponding to audio input to the client device; and
  performing an action specific to the first application based on the response.

11. The one or more non-transitory machine-readable storage media of claim 10, wherein the first notification message comprises an indication that a communication has been received by the client device, and wherein the action comprises:
  generating a reply to the communication received by the client device, the reply being formatted for sending by the first application; and
  sending the reply to the client device.

12. The one or more non-transitory machine-readable storage media of claim 10, wherein the response comprises an indication of the action, and the operations further comprise:
  making a determination that the action is an acceptable action.

13. The one or more non-transitory machine-readable storage media of claim 10, wherein the operations further comprise:
  determining, based on the one or more conflict rules, a priority associated with the first and second notification messages;
  wherein the first notification message is sent to the client device in accordance with the priority.

14. The one or more non-transitory machine-readable storage media of claim 10, wherein detecting the notification condition comprises analyzing ambient noise from a device that caused the event.

15. The one or more non-transitory machine-readable storage media of claim 10, wherein detecting the notification condition and identifying the first application are performed by analyzing information provided by the client device or an application server.

16. An electronic system comprising:
  one or more processing devices; and
  one or more non-transitory machine-readable storage media storing instructions that are executable by the one or more processing devices to perform operations comprising:
    detecting a notification condition, the notification condition comprising an event that occurred on a client device that is configured for communication with the one or more processing devices;
    identifying a first application that is stored at the client device, wherein the first application is configured to generate data for rendering a first notification message related to the notification condition;
    generating the first notification message for the notification condition, the first notification message comprising one or more attributes, the one or more attributes at least specifying how the first notification message is to be presented by the first application at the client device;
    detecting a conflict between transmittal of the first notification message at a time that is concurrent with transmittal of a second notification message, wherein a second application is stored at the client device and is configured to generate data for rendering the second notification message and the first application differs from the second application;

applying one or more conflict rules to the first notification message and the second notification message;

selecting, based on application of the one or more conflict rules, the first notification message for transmittal to the client device;

transmitting the first notification message to the client device;

receiving, from the client device, a response to the first notification message, the response comprising data corresponding to audio input to the client device; and performing an action specific to the first application based on the response.

17. The electronic system of claim 16, wherein the first notification message comprises an indication that a communication has been received by the client device, and wherein the action comprises:

generating a reply to the communication received by the client device, the reply being formatted for sending by the first application; and sending the reply to the client device.

18. The electronic system of claim 16, wherein the response comprises an indication of the action, and the operations further comprise:

making a determination that the action is an acceptable action.

19. The electronic system of claim 16, wherein the operations further comprise:

determining, based on the one or more conflict rules, a priority associated with the first and second notification messages;

wherein the first notification message is sent to the client device in accordance with the priority.

20. The electronic system of claim 16, wherein detecting the notification condition comprises analyzing ambient noise from a device that caused the event.

* * * * *